United States Patent [19]

Hocker et al.

[11] 3,859,299

[45] Jan. 7, 1975

[54] DIOXAZOLONE ISOCYANATES

[75] Inventors: Jürgen Hocker, Koeln; Rudolf Merten, Leverkusen, both of Germany

[73] Assignee: Bayer Aktiengesellschaft, Leverkusen, Germany

[22] Filed: Nov. 15, 1972

[21] Appl. No.: 306,784

[30] Foreign Application Priority Data
Nov. 26, 1971 Germany............................ 2158740

[52] U.S. Cl.. 260/307 A, 260/75 TN, 260/77.5 AP, 260/77.5 MA, 260/77.5 AN, 260/244 R, 260/246 R, 260/500.5 H
[51] Int. Cl............................................ C07d 85/06
[58] Field of Search......... 260/307 A, 244 R, 246 R

[56] References Cited
UNITED STATES PATENTS
3,182,068  5/1965  Sasse et al. ...................... 260/306.7
3,335,131  8/1967  Pizzarello et al. .................. 260/239

OTHER PUBLICATIONS

Noller–"Chemistry of Organic Compounds," (1965), W. B. Saunders Company – p. 339, 529.

*Primary Examiner*—Raymond V. Rush
*Attorney, Agent, or Firm*—Gene Harsh

[57] ABSTRACT

Compounds of the formula

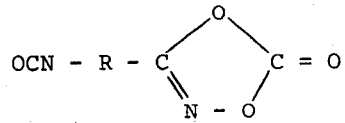

wherein R is a divalent radical corresponding to $C_1$ to $C_{18}$ alkyl, $C_7$ to $C_{18}$ aralkyl or $C_6$ to $C_{14}$ aryl. These compounds are useful as isocyanate precursor compounds in the preparation of polyurethane plastics by the well-known polyaddition process simply by heating.

6 Claims, No Drawings

DIOXAZOLONE ISOCYANATES

This invention relates to isocyanate compounds and more particularly to organic isocyanate compounds that contain heterocyclic rings.

It is the object of this invention to provide compounds that contain at least one isocyanate group and one of the groups:

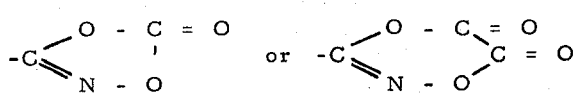

at least once in the molecule and also to provide a process for the preparation of said compounds.

It is known to react hydroxamic acids with phosgene or oxalychloride to produce heterocyclic ring systems according to the teachings of, for example, U.S. Pat No. 3,531,425. The reaction of amino groups with phosgene or oxalyl chloride is also known and is described, for example, in W. Siefken, Ann. 562, 75 (1949). It is further known to produce diisocyanates by phosgenating salts of aliphatic aminohydroxamic acids of volatile acids.

It has now surprisingly been found that new compounds which contain at least one isocyanate group and at least one of the above groups in the molecule may be prepared very advantageously and in high yields by the process according to the invention.

This invention provides compounds of the general formula:

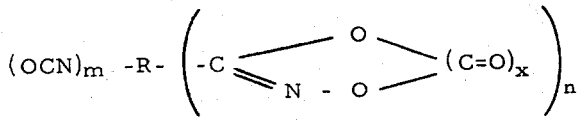

wherein
R is an aliphatic, cycloaliphatic, araliphatic, aromatic or heterocyclic radical having a valency of $n + m$;
$x$ is 1 or 2;
$m$ is an integer of from 1 to 4; and
$n$ is an integer of from 1 to 4.

The isocyanates which are preferred according to the invention are those wherein R of the general formula above is a $C_1$ to $C_{18}$ alkyl, $C_3$ to $C_{14}$ cycloalkyl, $C_7$ to $C_{18}$ aralkyl or $C_6$ to $C_{14}$ aryl radical with a valency of $m + n$ and wherein $x$, $m$ and $n$ have the meanings given above.

Isocyanates which are more particularly preferred are those wherein m, n and x in the general formula are each equal to 1, and R is a branched or unbranched $C_4$ to $C_{12}$ alkylene radical.

The radical, R, in the above formula may be substituted. Some suitable substituents are, for example, aryl radicals, preferably phenyl radicals; CN radicals; S-alkyl and alkoxy groups which preferably contain 1 to 4 carbon atoms; dialkyl substituted amino groups, preferably those which are substituted with lower aliphatic radicals, preferably containing 1 to 4 carbon atoms; halogen atoms, preferably fluorine, chlorine or bromine; lower halogenated alkyl radicals, preferably containing 1 to 4 carbon atoms and preferably substituted with fluorine and/or chlorine or nitro groups; and in the case of aromatic and heterocyclic radicals the substituents may also be lower alkyl groups, preferably those containing 1 to 4 carbon atoms.

The following are examples of typical representatives of the isocyanates of the invention:

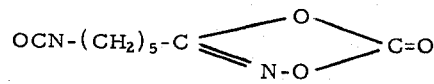

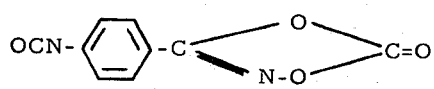

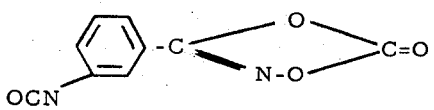

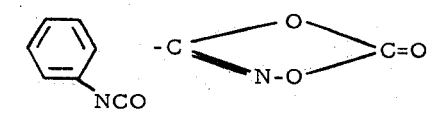

Some additional examples of the isocyanates of the invention are:
5-(ω-isocyanato-propane)-1,3,4-dioxazolinone-(2);
5-(ω-isocyanato-butane)-1,3,4-dioxazolinone-(2);
5-(ω-isocyanato-hexane)-1,3,4-dioxazolinone-(2);
5-(ω-isocyanato-heptane)-1,3,4-dioxazolinone-(2);
5-(ω-isocyanato-octane)-1,3,4-dioxazolinone-(2);
5-(ω-isocyanato-undecane)-1,3,4-dioxazolinone-(2);
5-(ω-isocyanato-dodecane)-1,3,4-dioxazolinone-(2);
5-(ω-isocyanato-octadecane)-1,3,4-dioxazolinone-(2);
5-[4'-isocyanato-diphenylmethane-(4'')]-1,3,4-dioxazolinone-(2);
5-[4'-isocyanato-diphenylether-(4'')]-1,3,4-dioxazolinone-(2).

The isocyanates are prepared by a process comprising reacting a metal salt of an aminohydroxamic acid of the general formula:

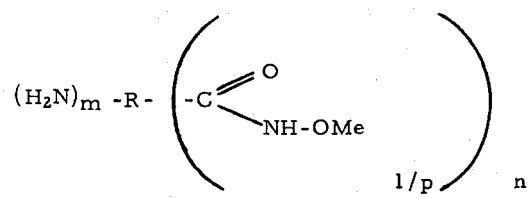

wherein
R, m and n have the meanings given above,
Me is a p-valent metal, preferably Li, Na, K, Be, Mg, Ca, Sr, Ba, B, Al, Fe, Co, Ni, Hg, Cr, Zn, Pb, Mn or Sb; and
$p$ represents an integer of from 1 to 4;
with phosgene or oxalyl chloride at temperatures of between about −25°C. and about 200°C., if desired, in an inert solvent.

Me represents any metal having a valency of p, preferably metals of the First and Second Main Group of the Periodic System and in particular Li, Na, K, Be, Mg, Ca, Sr, Ba, B, Al, Fe, Co, Ni, Hg, Cr, Zn, Pb, Mn and Sb. These metals are preferably used in their mono-to tetravalent state.

The preferred metal salts of amino hydroxamic acids are the sodium or potassium salts.

Preferred starting compounds for use in the process are the sodium or potassium salts of:

ω-amino-propane-hydroxamic acid;
ω-amino-butane-hydroxamic acid;
ω-amino-pentane-hydroxamic acid;
ω-amino-hexane-hydroxamic acid;
ω-amino-heptane-hydroxamic acid;
ω-amino-octane-hydroxamic acid;
ω-amino-undecane-hydroxamic acid;
ω-amino-dodecane-hydroxamic acid;
ω-amino-octadecane-hydroxamic acid;
2-amino-benzohydroxamic acid;
3-amino-benzohydroxamic acid;
4-amino-benzohydroxamic acid;
4-amino-diphenylmethane-hydroxamic acid-(4'); and
4-amino-diphenylether-hydroxamic acid-(4').

It is preferred to use, as the metal salt of an aminohydroxamic acid, a metal salt of ε-aminocapro-hydroxamic acid, the sodium or potassium salt of ε-aminocapro-hydroxamic acid being particularly preferred.

The metal salts of aliphatic ω-amino-hydroxamic acids are easily obtained by the ring opening of cyclic lactams with one equivalent of hydroxylamine and one equivalent of $Me(OH)_p$ in the presence or absence of a solvent.

Instead of using the free hydroxylamine one could, of course, use a salt of hydroxylamine, for example, hydroxyl ammonium chloride or hydroxyl ammonium sulphate, with twice the equivalent quantity of $Me(OH)_p$. The ring opening of the lactam is preferably carried out in a solvent in which the metal salt of the aminohydroxamic acid can subsequently be reacted directly with phosgene or oxalyl chloride without having first to be isolated. In some cases, however, it may be advantageous to isolate the metal salt of the amino hydroxamic acid.

The process of preparing the compounds according to the invention is preferably carried out by introducing the metal salt of the aminohydroxamic acid into a solution of phosgene or oxalyl chloride in a suitable solvent at temperatures of between about −20°C. and about 200°C., preferably between about 0° and about 50°C. If the process is carried out with phosgene, the temperature is raised to about 60°–150°C. while more phosgene is introduced. After removal of the excess phosgene, the compound of the invention is separated from the solvent by distillation or by extraction with some other suitable solvent. The process may also be carried out by introducing the metal salt of aminohydroxamic acid into the reaction vessel in the form of a solution or suspension in a suitable solvent and then introducing or adding dropwise the phosgene or oxalyl chloride.

The inert solvents customarily used for phosgenation are suitable, some of which are, for example, benzene, toluene, xylene, chlorobenzene, o-dichlorobenzene, and chloronaphthalenes. Solvents which are particularly suitable for use in the process are tetramethylenesulphone, dioxane, tetrahydrofuran and tetramethylurea.

The reactions of phosgene or oxalyl chloride with the metal salts of aminohydroxamic acids may be carried out under pressure if desired.

A variation of the process of reacting metal salts of aminohydroxamic acids with phosgene comprising a 2-phase phosgenation which is carried out as follows: A solution of the metal salt of aminohydroxamic acid and a base in water is mixed by suitable means with a solution of phosgene in a solvent which is immiscible with water in such a way that the temperature is maintained between about −25°C. and about 30°C. The two phases are then separated and the compounds according to the invention are obtained by recrystallization or low temperature recrystallization after removal of the solvent by distillation under reduced pressure.

Both inorganic and organic bases may be used in the process, however, NaOH and KOH are especially suitable. The solvents which are immiscible with water may be any solvents of the kind that are inert to phosgene and to the base employed. Methylene chloride, chloroform, carbon tetrachloride, perchloroethylene, benzene, toluene, xylene, chlorobenzene and dichlorobenzene are especially suitable. The quantity of phosgene used is about 2 mols per mol of metal salt of aminohydroxamic acid but may be less, however, the phosgene is preferably used in excess. The quantity of base used is preferably so calculated that after completion of the reaction the aqueous phase has a pH of between 5 and 9. The reaction temperature should be between about −25°C. and about 30°C. preferably between about −10°C. and about 5°C.

The metal salt of aminohydroxamic acid is preferably a metal salt of ε-amino-capro-hydroxamic acid, preferably the sodium or potassium salt.

The processes described hereinabove may be carried out either batch-wise or continuously.

The compounds according to the invention have characteristic absorptions in the IR spectrum. In addition to the isocyanate absorption at 2240 to 2280 cm$^{-1}$, characteristic double bands occur at 1820 to 1880 cm$^{-1}$ for the ring system I and at 1770 to 1830 cm$^{-1}$ for the ring system II:

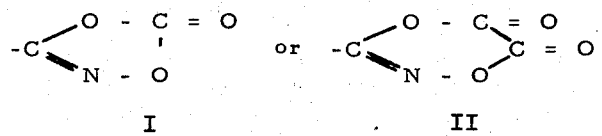

I . II

The isocyanate compounds of the invention may be used in known applications in the areas of isocyanate and urethane chemistry, for example, they may be utilized as the isocyanate precursor in the manufacture of polyurethane plastics, by the well-known isocyanate polyaddition process. The isocyanate compounds of the invention may easily be converted to polyisocyanates simply by heating to expel carbon dioxide, respectively a mixture of carbon dioxide and carbon monoxide.

The compounds of the invention are, however, also capable to undergo an addition reaction e.g. with alcoholic hydroxyl compounds at their ring moiety without expelling carbon dioxide if they are reacted with hydroxyl compounds at moderate temperatures. Thus it is possible to prepare polymers having interesting mechanical properties e.g. by reacting the compound which is hereinafter described in example 1 with hydroxy polyesters whereby the ring moiety forms an alkoxy carbonyl hydroxamate group according to following reaction scheme (R stands for the radical obtained by removing 1 hydroxy group from an hydroxy polyester):

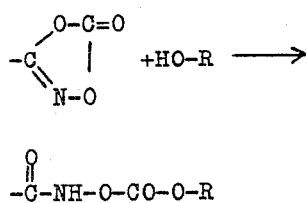

The invention is further illustrated but it is not intended that it be limited by the following Examples in which all parts and percentages are by weight unless otherwise indicated.

EXAMPLES

EXAMPLE 1

About 200 parts of phosgene are condensed in about 910 parts of anhydrous toluene at about −10°C., and about 96 parts of the sodium salt of ε-amino-caprohydroxamic acid are introduced incrementally. The reaction mixture is slowly heated to about 90°–95°C. while phosgene is introduced. Phosgenation is then continued for about 5 hours at about 95°C. and excess phosgene is then blown out with nitrogen. The reaction mixture is filtered, the solvent is removed by evaporation under vacuum and about 32 parts of a compound having characteristic absorption in the IR spectrum at 2260 cm$^{-1}$ (NCO group) and at 1820 and 1860 cm$^{-1}$ (dioxazolinone ring) are obtained, said compound having the following formula:

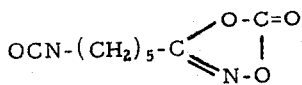

1 mol of this compound is reacted with a polyester having an OH-number of 225 and which has been prepared by reacting 3 molar portions of butylene glycol, 3 molar portions of trimethylol propane, 4 molar portions of adipic acid and 1 molar portion of phthalic acid. The amount of polyester has been such to provide one OH-group for each NCO group and one further OH group for each dioxazolidone group. The reactants are mixed at approximately 50°C and are subsequently heated for 15 minutes to 80°C. A polymer containing urethane and alcoxycarbonylhydroxamate groups is obtained which can be used as binder for lacquers having good mechanical properties.

EXAMPLE 2

About 40 parts of phosgene are condensed in about 200 parts of anhydrous tetramethylene sulphone, and about 16.8 parts of the sodium salt of ε-aminocaprohydroxamic acid are introduced incrementally at about −10°C. The reaction mixture is slowly heated to about 120°C. and phosgene is introduced for about 30 minutes and phosgenation is continued for a further 30 minutes at about 135°C. The nitrogen is blown out and precipitated sodium chloride is removed by filtration and traces of phosgene and hydrochloric acid are removed under vacuum at about 100°C. The resulting solution contains about 13.8 parts by weight of the compound prepared in Example 1 as indicated by titration with n-dibutylamine and gas chromatography.

EXAMPLE 3

A solution of about 16.8 parts of the sodium salt of ε-aminocaprohydroxamic acid and about 16.8 parts of NaOH in about 100 parts of water and a solution of about 20 parts of phosgene in about 80 parts of methylene chloride are introduced at equal rates into a solution of about 4 parts of phosgene in about 50 parts of methylene chloride at about −10°C. with vigorous stirring. The phases are separated, the aqueous phase is extracted with methylene chloride, the methylene chloride phases are dried over sodium sulphate and the solvent is removed under vacuum.

About 9.5 parts of the compound of Example 1 which has characteristic bands in the IR spectrum at 2260 cm$^{-1}$, 1820 cm$^{-1}$ and 1860 cm$^{-1}$ are obtained.

EXAMPLE 4

A solution of about 16.8 parts of the sodium salt of ε-aminocaprohydroxamic acid and about 28 parts of NaOH in about 200 parts of water and a solution of about 26 parts of phosgene in about 180 parts of methylene chloride are introduced at equal rates into a solution of about 4 parts of phosgene in about 25 parts of methylene chloride at 0° to 10°C. with vigorous stirring. The reaction mixture is further processed as described in Example 3 and about 6.0 parts of the compound of Example 1 which has the characteristic IR absorptions are obtained.

Although the invention is illustrated in considerable detail in the foregoing Examples, it is to be understood that said Examples are presented solely for purposes of illustration and that many variations may be made by those skilled in the art without departing from the spirit and scope of the invention.

What is claimed is:

1. An isocyanate of the formula

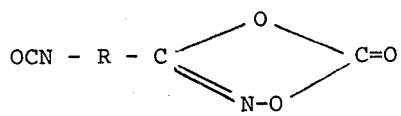

wherein R is divalent and is selected from the group consisting of $C_1$ to $C_{18}$ alkyl, phenyl,

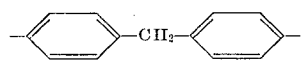

and

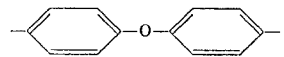

2. The isocyanate of claim 1 wherein R is branched or unbranched $C_4$ to $C_{12}$ alkylene.

3.

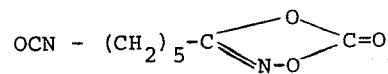

4. 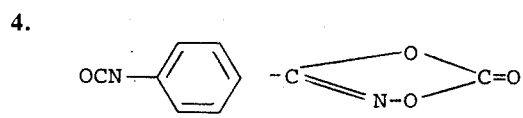
5. 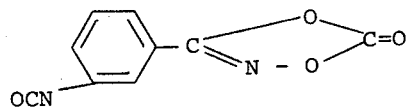
6. 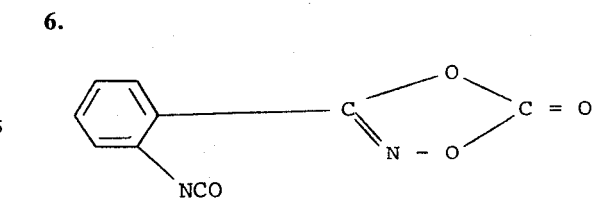
* * * * *